Nov. 11, 1969  H. J. FINDLEY  3,477,320
TOOLHOLDER APPARATUS AND TURNING METHOD
Filed July 25, 1963  5 Sheets-Sheet 1
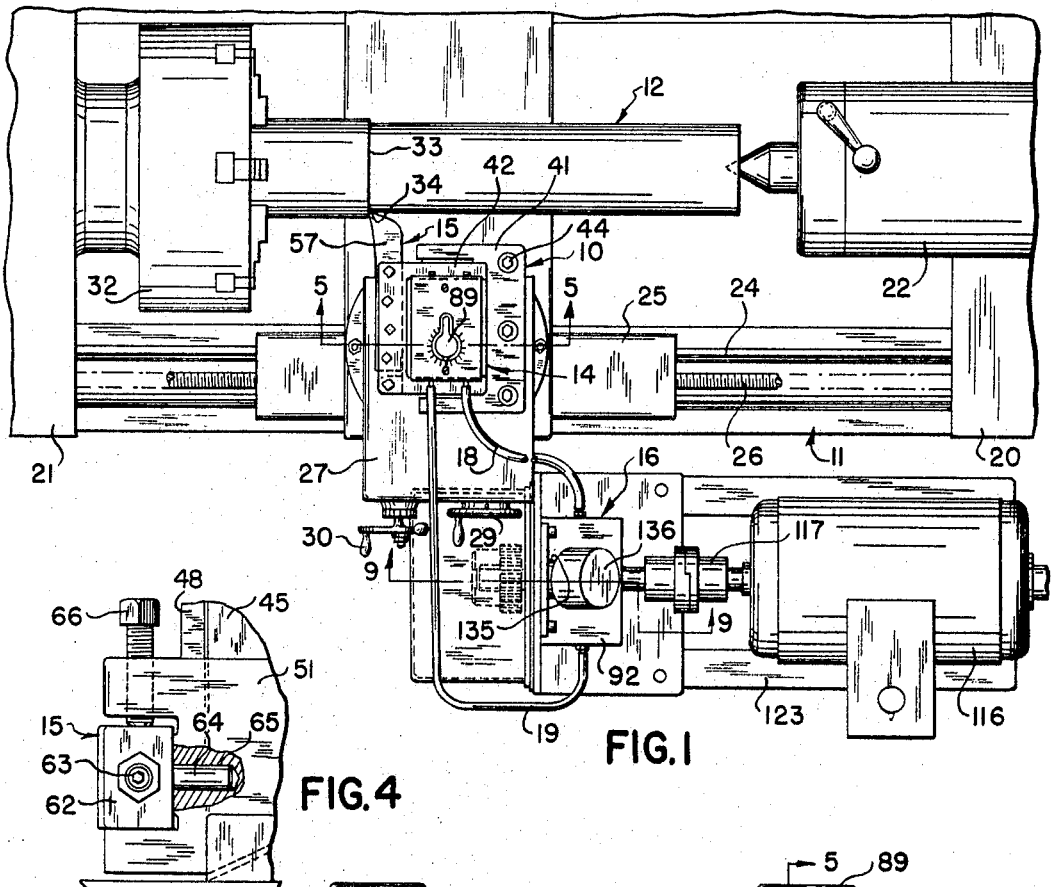
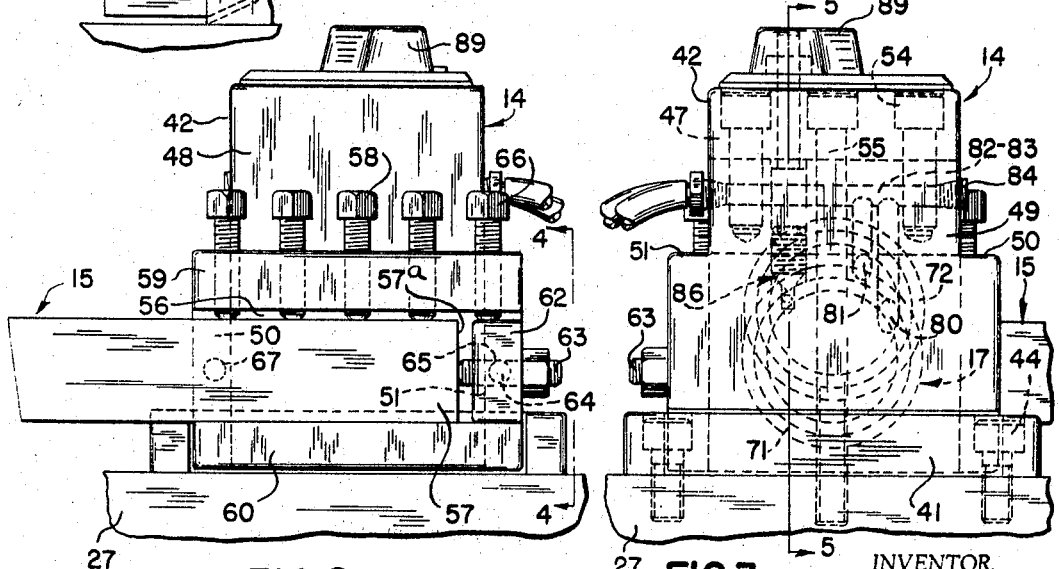
INVENTOR.
HOWARD J. FINDLEY
BY Williams, David,
Hoffmann & Yount
ATTORNEYS Nov. 11, 1969  H. J. FINDLEY  3,477,320
TOOLHOLDER APPARATUS AND TURNING METHOD
Filed July 25, 1963  5 Sheets-Sheet 2
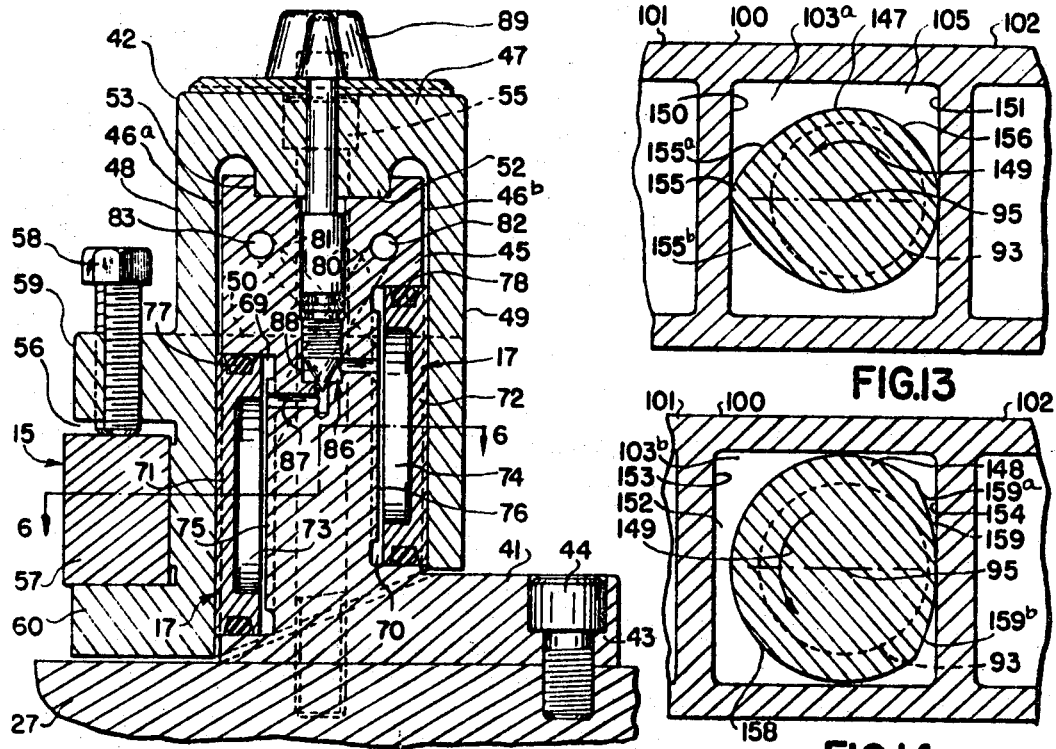
FIG. 5
FIG. 13
FIG. 14
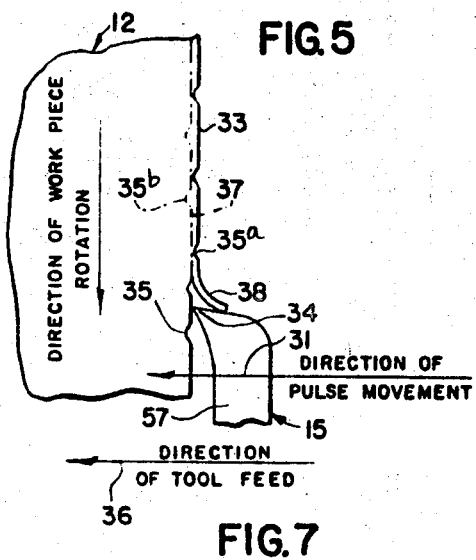
FIG. 7
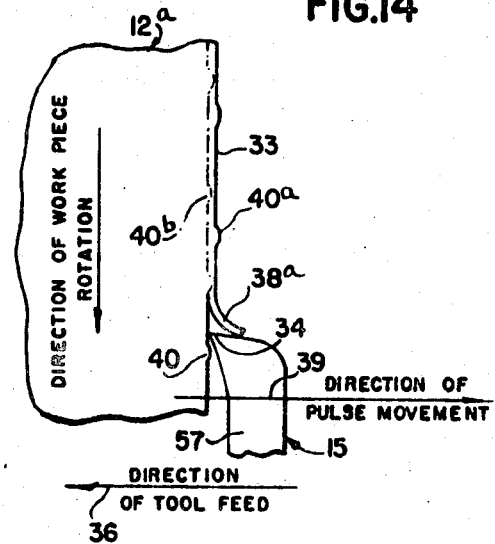
FIG. 8
INVENTOR.
HOWARD J. FINDLEY
BY Williams, David.
Hoffmann & Yount
ATTORNEYS

INVENTOR.
HOWARD J. FINDLEY
ATTORNEYS

Nov. 11, 1969  H. J. FINDLEY  3,477,320
TOOLHOLDER APPARATUS AND TURNING METHOD
Filed July 25, 1963  5 Sheets-Sheet 4

INVENTOR.
HOWARD J. FINDLEY
BY Williams, David,
Hoffmann & Yount
ATTORNEYS

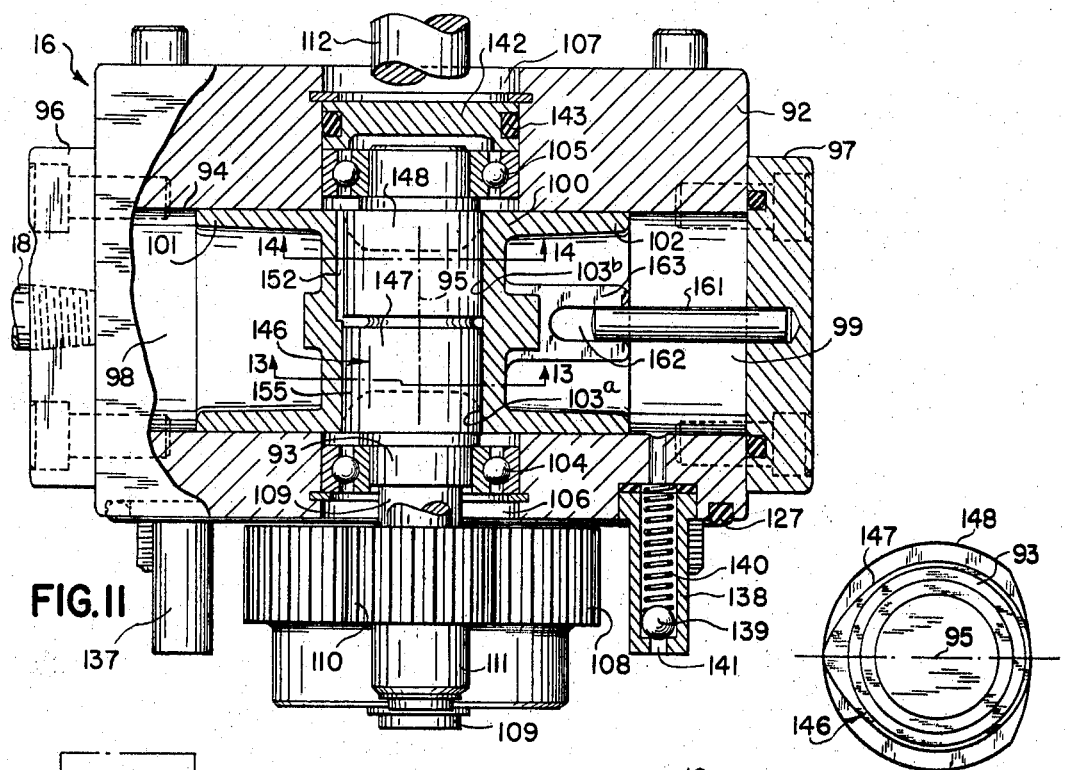
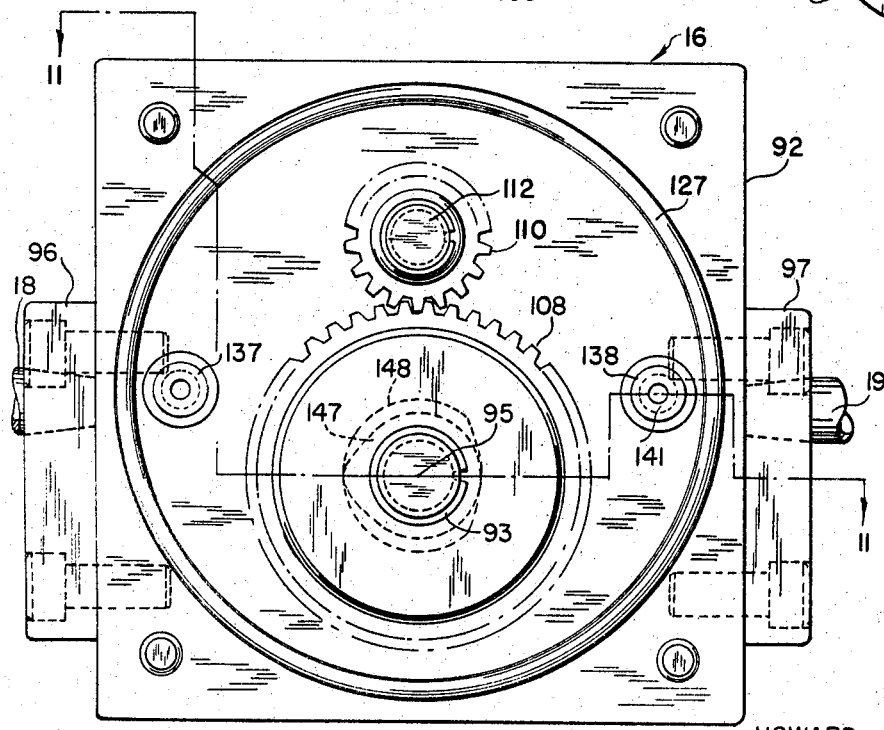

United States Patent Office 3,477,320
Patented Nov. 11, 1969

3,477,320
TOOLHOLDER APPARATUS AND
TURNING METHOD
Howard J. Findley, Cleveland, Ohio, assignor to Textron
Inc., Providence, R.I., a corporation of Rhode Island
Filed July 25, 1963, 297,637
Int. Cl. B23b 29/00, 3/00; B24b 7/00
U.S. Cl. 82—36                                              22 Claims This invention relates to machine tools and, in particular, provides novel toolholder apparatus and a novel turning method by which the material being removed from a workpiece by a cutting tool is caused to be broken into chips for easier and safer handling of the cuttings.

An object of the invention is to provide a novel method and apparatus in which sudden short-stroke pulse movements imparted to the cutting tool cause minor irregularities on the workpiece portion being cut and corresponding thickness variations in the cutting being removed, with the result that the cutting readily breaks into chips as it is produced.

Another object is to provide a novel method and apparatus in which such short-stroke pulse movements of the cutting tool are along the direction of the feed movement of the tool and transverse to the workpiece portion or shoulder against which the tool is being pressed.

Still another object is to provide novel apparatus comprising flexible means supporting the cutting tool, and means for generating hydraulic pressure pulsations and causing the same to rapidly flex the tool supporting means for producing the sudden pulse movements of the tool.

A further object is to provide novel apparatus of the character above mentioned and comprising cam-actuated piston means for generating the hydraulic pressure pulsations.

Additionally, this invention provides a novel toolholder unit comprising a cutting tool and means for imparting sudden short-stroke pulse movements thereto, and means whereby the same unit can be used in either a right-hand or left-hand work position.

Other objects, novel characteristics and advantages of this invention will be apparent in the following detailed description and in the accompanying drawings forming a part of this specification and in which, FIG. 1 is a partial top plan view showing novel apparatus provided by this invention and usable in the novel method, the toolholder unit of the apparatus being shown in its normal or right-hand work position;

FIG. 2 is a partial side elevation of the toolholder unit of the apparatus as seen from the side on which the cutting tool is mounted;

FIG. 3 is a side elevation of the tool holder unit as seen from the opposite side;

FIG. 4 is a fragmentary end view, partially in section, showing back-up means for the shank of the cutting tool, the view being taken in the direction indicated by the line 4—4 of FIG. 2;

FIG. 5 is a transverse vertical section taken through the toolholder unit on section line 5—5 of FIGS. 1 and 3;

FIG. 7 is a development diagram showing the workpiece portion being cut and exaggerated irregularities formed thereon by the pulse movements of the cutting tool;

FIG. 8 is a development diagram similar to that of FIG. 7 and showing exaggerated irregularities formed by pulse movements of the cutting tool in the opposite direction;

FIG. 10 is an end elevation of the pulsation generating means with the reservoir section omitted therefrom;

FIG. 11 is a horizontal axial section taken through the pulsation generating means as indicated by the irregular section line 11—11 of FIG. 10;

FIG. 12 is an end elevation showing the camshaft of the pulsation generating means in a detached relation;

FIG. 13 is a partial vertical section taken transversely of the camshaft of the pulsation generating means as indicated by section line 13—13 of FIG. 11;

FIG. 14 is a similar vertical section taken as indicated by section line 14—14 of FIG. 11.

In the novel method of this invention sudden short-stroke pulse movements are imparted to a cutting tool during the cutting operation whereby minor irregularities are formed on the workpiece portion being cut, with resulting variations in the thickness of the material being removed as a cutting, and a consequent breakage of the cutting into chips as the cutting is being formed. Novel toolholder apparatus 10 is shown in the accompanying drawings in conjunction with a machine tool, in this case a lathe 11, and is usable in the novel method for accomplishing a machining operation on a workpiece 12 with the desired breakage of the removed material into chips.

Figure 6:
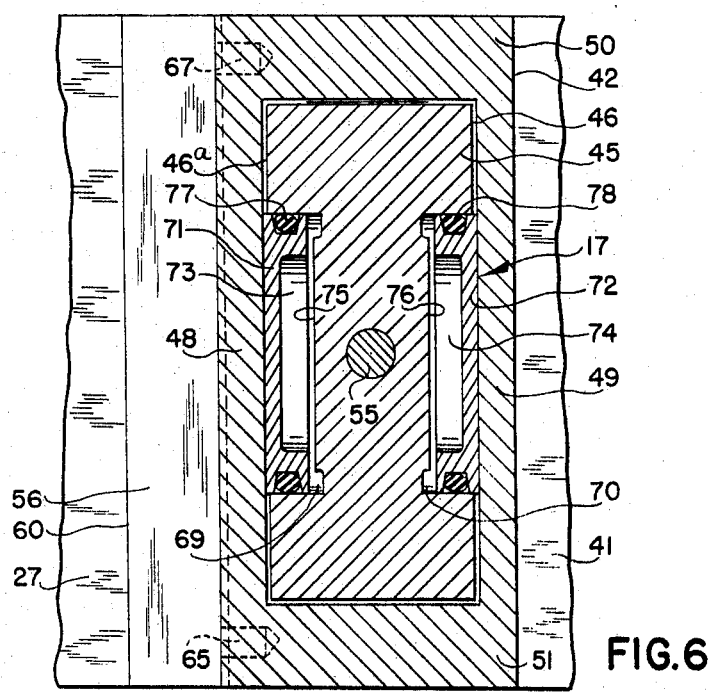
FIG. 6 is a horizontal section taken through the toolholder unit on section line 6—6 of FIG. 5 but with the tool and the tool back-up means omitted.
Figure 15:
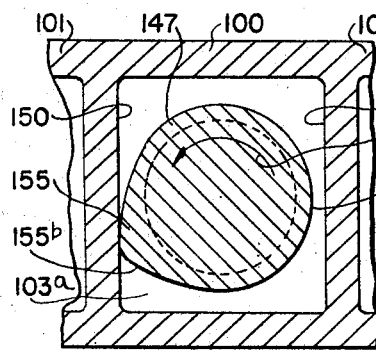
FIGS. 15 and 17 are sectional views similar to that of FIG. 13 but showing the cam member in other rotative positions.
Figure 17:
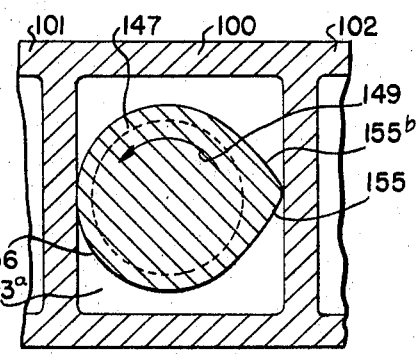
Figure 16:
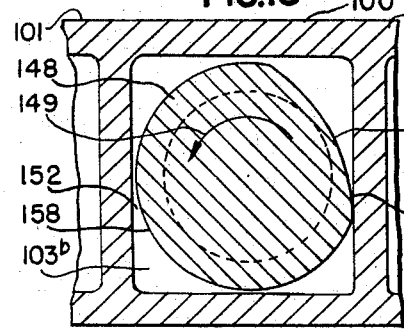
FIGS. 16 and 18 are sectional views similar to that of FIG. 14 but showing the cam member in different rotative positions.
Figure 18:
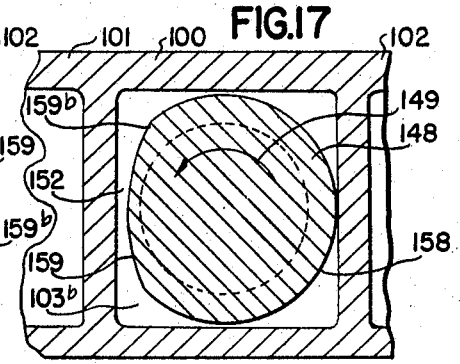

The apparatus 10 comprises, in general, a holder unit 14 for supporting a cutting tool 15 and imparting the sudden short-stroke pulse movements thereto, and a hydraulic pressure pulsation generating means 16 for supplying pressure pulsations to the holder unit for causing the pulse movements of the tool. The holder unit 14 includes hydraulic pressure pulsation responsive means 17 (see FIGS. 3, 5 and 6) to which the pressure pulsations are supplied through flexible conduits 18 and 19 extending thereto from the pulsation generating means 16.

The lathe 11 is shown as being of a conventional form having a frame 20 which includes a head stock 21 and a tail stock 22. The frame 20 also includes guideway means 24 supporting a longitudinaly movable carriage 25 actuatable by the customary feed screw 26. The carriage 25 supports a cross slide 27 having the usual manual control handles 29 and 30 and on which the holder unit 14 is suitably mounted.

The lathe 11 also includes a rotatable workholder 32 supported and driven from the head stock 21, and the workpiece 12 is shown as being a cylindrical workpiece mounted in the workholder 32. The workpiece 12 is shown as having a circumferential shoulder 33 against which the cutting tip 34 of the tool 15 is being pressed during the cutting operation by a longitudinal feed movement imparted to the carriage 25 by the feed screw 26.

FIGS. 1 and 7 of the drawings illustrate the novel method procedure during which the sudden pulse movements of the tool 15 along the path of the feed movement thereof cause the tip 34 to produce minor irregularities 35 on the workpiece portion 33 being cut. In the diagrammatic view of FIG. 7 the direction of the pulse movements of the tool 15 is represented by the arrow 31 and is toward the workpiece portion or shoulder 33 against which the tool is being pressed by a feed movement in the same direction as that represented by the arrow 36. The resulting irregularities 35 therefore appear as small depressions or notches in the workpiece portion 33 and are spaced apart along the cutting path 37 in accordance with the frequency of the pulse movements of the tool and the speed of rotation of the workpiece. The depth of the notches is in accordance with the magnitude of the pulse movement which is usually a short-stroke movement appropriate for the cutting operation being performed. The irregularities 35a are those which were formed on the workpiece portion 33 during the previous revolution of the workpiece 12, and the irregularities designated 35b are those which will be formed by the tool tip 34 during the revolution of the workpiece which is shown as being in progress.

The portion of the workpiece 12, which is shown in FIG. 7 as being removed by the tool 15, is in the form of a cutting 38 and is being deflected by the tool as the material is being removed. The irregularities 35a of the previous revolution are removed from the workpiece 12 with the cutting 38 being formed during the revolution shown to be in progress. The irregularities 35b should preferably be in an out-of-phase relation to the previously formed irregularities 35a, as is represented in FIG. 7. The cutting will have thickness variations with minimum thickness, and resulting areas of weakness, occurring at the locations of the irregularities 35a. Since the irregularities 35a represent points of decreased thickness and strength in the cutting 38, breakage thereof will readily occur at these locations as the cutting is produced and deflected by the tool 15. When the removed material is in the form of the chips into which the cutting 38 is thus broken, it can be more readily collected and handled and is less likely to interfere with the machining operation or to cause personal injury to the machine operator.

FIG. 8 of the drawings illustrates the same novel method procedure but shows the direction of the pulse movements of the tool 15 as being away from the workpiece portion 33 being cut and represented by the arrow 39. The pulse movements of the tool 15 again cause minor irregularities on the workpiece 12a but, in this case, the irregularities are small projections 40 instead of the indentations or notches 35 described above in connection with the illustration in FIG. 7. The projections 40a are those which were formed on the workpiece portion 33 during the preceding revolution of the workpiece 12a, and the projections 40b are those which will be formed during the revolution shown to be in progress in FIG. 8.

The material being removed from the workpiece 12a is a cutting 38a which is being deflected by the tool 15 as the cutting is produced. The irregularities 40 will cause variations in the thickness of the cutting 38a and resulting points of weakness therein, and breakage of the cutting into chips will readily occur as the cutting is produced and deflected by the tool 15. The spacing of the irregularities 40 and of the resulting points of weakness on the cutting 38a will be in accordance with the frequency of the pulse movements of the tool 15 and the speed of rotation of the workpiece 12a, and again, the irregularities 40b are preferably in an out-of-phase relation to the previously formed irregularities 40a.

The holder unit 14 will be described next and, as shown in FIGS. 1 to 6 of the drawings, comprises a support means 41 and a holder member 42 connected therewith and having the cutting tool 15 mounted thereon. The support means 41 is shown as having a plate portion 43 at the base thereof which is secured on an appropriate portion of the cross slide 27 as by suitable screws 44. The support means 41 also includes a reaction means adjacent which the holder member 42 is located and which is here shown in the form of an abutment projection 45 formed integral with the plate portion 41 and rising thereabove.

The holder member 42 is shown as being in the form of a yoke having an intermediate connecting web wall portion 47 at the top thereof and a pair of laterally spaced flexible side portions or arms 48 and 49 depending from the connecting portion. The yoke 42 is disposed with the connecting web portion 47 in engagement with the top of the abutment projection 45 and with the flexible arms 48 and 49 in a depending relation on opposite sides of the projecting and spaced from the later by intervening small clearance spaces 46a and 46b. On the front and rear sides of the yoke 42, that is on the sides facing toward and away from the workpiece 12, the arms 48 and 49 are connected by tie wall portions 50 and 51 so that both arms move in unison during the flexing thereof. The connecting walls 50 and 51 are formed integral with the arms 48 and 49 and are located adjacent the lower ends of the arms.

The connecting web portion 47 is shown as having a key-like projection 52 on the underside thereof which is received in a slot-like locating recess or keyway 53 provided in the top of the abutment projection 45. The connecting web portion 47 is secured against the top of the abutment projection 45 by suitable screws 54 and 55 so that the key-like portion 52 will be retained in the slot recess 53. The connecting web portion 47 is thus secured to the top of the abutment projection 45 in a rigid manner while the arms 48 and 49 remain relatively free for flexing thereof toward and away from the sides of the abutment projection. The screw 55 is shown as being of a length to extend down through the abutment projection 45 into the support portion of the cross slide 27.

One of the yoke arms, in this case the arm 48, is provided with a laterally extending channel-shaped recess 56 for receiving the shank 57 of the tool 15. The tool shank 57 is secured in the recess 56 as by suitable clamping screws 58 having threaded engagement in one of a pair of parallel projections 59 and 60 which form the top and bottom walls of the recess. An abutment block 62 is provided in the recess 56 for taking the rearward thrust of the tool shank 57. The block 62 is here shown as having an adjusting screw 63 mounted therein and positioned so that the inner end of the screw is engaged by the heel portion 57a of the tool shank.

The abutment block 62 is secured in the recess 56 in a manner to permit the block to be readily removed and reassembled in a different location in the recess. For the purpose of this detachable connection the block 62 is provided with a projecting stem 64, as shown in FIG. 4, and which stem is insertable into a suitably located opening 65 of the yoke arm 48. The opening 65 is located near one end of the recess 56 so that, when the stem 64 is inserted therein and the block 62 is also tightly clamped against the lower wall 60 by a set screw 66, the abutment block will be rigidly secured to the yoke 42 in the proper location for back-up engagement of the heel portion 57a of the tool with the adjusting screw 63.

In FIGS. 1, 2 and 4 the abutment block 62 is shown in the recess 56 at the end thereof appropriate for the position in which the cutting tool 15 is shown in FIG. 1. This position of the cutting tool can be conveniently referred to as a right-hand position inasmuch as the tool occupies the conventional position for a lathe tool for a cutting operation against the workpiece shoulder 33 by a feed movement of the tool toward the workholder 32. When it is desirable to have the tool 15 on the opposite side of the holder unit 14, that is with the tool on the side nearest the tail stock 22 and movable against a workpiece portion by a feed movement in a direction toward the tail stock, the holder unit can be repositioned for such a left-hand operating position of the tool.

The repositioning of the holder unit involves swinging of the support 41 and the yoke 42 through 180° of movement and a reversal of the positions of the tool 15 and the abutment block 62. When the support 41 and the yoke 42 have been thus swung through 180° of movement, the recess 56 will then be on the opposite side of the holder unit 14 from what is shown in FIG. 1 and the tool 15 can then be repositioned in the recess with the cutting tip 34 extending toward the workpiece 12 and engageable therewith. The repositioning of the abutment block 62 consists in shifting the same to the end of the recess 56 toward which the heel 57a is then presented.

The yoke 42 is provided with an opening 67 similar to the opening 65 but located at the opposite end of the recess 56 and into which the stem 64 of the abutment block 62 is inserted as a part of the repositioning of this block.

The pressure pulsation responsive means 17 of the holder unit 14 comprises cylinder means, in this case, a pair of cylinders 69 and 70 formed in the abutment projection 45 and pistons 71 and 72 operable in such cylinders. The pistons 71 and 72 are disposed in the cylinders 69 and 70 so that pressure chambers 73 and 74 are formed between the pistons and the walls 75 and 76 at the inner ends of the cylinders. The outer end faces of the pistons 71 and 72 press against the adjacent sides of the flexible arms 48 and 49. Suitable packing rings 77 and 78 are provided for confining the pressure fluid in the cylinder chambers 73 and 74 and, in this case, are mounted on the pistons.

The fluid pressure pulsations enter the cylinder chambers 73 and 74 through inclined passages 80 and 81 formed in the abutment projection 45 and which receive the pressure fluid from longitudinal passages 82 and 83 which extend completely through the abutment projection adjacent the top thereof. As shown in FIG. 3 the flexible conduits 18 and 19 are connected with the longitudinal passages 82 and 83 at one end thereof, depending upon the particular position of orientation of the holder unit 14 for either a right-hand or left-hand operating position of the tool 15. The passages 82 and 83 are closed at the opposite or unused end thereof by suitable plugs 84.

When a pressure pulsation is supplied to the cylinder chamber 73 the piston 71 pushes against the arm 48 and flexes the same in a direction away from the abutment projection 45 to thereby impart a sudden short-stroke pulse movement to the tool 15. Simultaneously with the delivery of a pressure pulsation into the cylinder chamber 73, the fluid pressure existing in the cylinder chamber 74 from a previous pressure pulsation supplied thereto, is relieved through the passages 81 and 83. Since the arm 49 is connected with the arm 48 by the tie walls 50 and 51, the arm 49 will be flexed in unison with the wall 48 in response to the work stroke of the piston 71.

The sudden pulse movement of the tool 15 produced by the flexing of the yoke 42 causes one of the minor irregularities 35 or 40, depending on the direction of the pulse movement, to be formed on the workpiece portion 33 as described above. As other such sudden pulse movements of the tool are produced in succession, additional irregularities are formed on the workpiece portion with the resulting breakage of the cutting into chips as the cutting is being separated from the workpiece.

The pressure pulsations supplied to the cylinder chamber 74 occur in an alternating relation to the pressure pulsations in the cylinder chamber 73, and the flexing of the arms 48 and 49 by the work strokes of the piston 72 likewise occurs in an alternating relation to the work strokes of the piston 71. The flexing of the arm 49 by the piston 71 causes return movements of the tool 15 in an opposite direction from the pulse movements produced the work strokes of the piston 70. Since the arm 48 is connected with the arm 49 by the tie walls 50 and 51, the arm 48 is flexed in unison with the arm 49 for causing such return movement of the tool 15 to its normal cutting position following each preceding pulse movement thereof.

The characteristics of the pulse movements of the tool 15 can be controlled or varied by the provision of bypass means 86 connecting the cylinder chambers 73 and 74. The bypass means 86 is shown in FIG. 5 as comprising a transverse connecting passage 87 controlled by a bypass valve 88 which is manually actuatable by a knob 89 located at the top of the yoke 42. Rotation of the valve 88 in one direction or the other by the knob 89 opens or closes the bypass passage 87 for a desired flow of pressure fluid from one to the other of the cylinder chambers 73 and 74. The bypass valve 88 can be set at the position in which the pistons 71 and 72 produce flexing of the arms 48 and 49 to give the best results in the cutting operation produced by the tool 15 and the breaking of the removed material into chips.

As was indicated above, the hydraulic pressure pulsations are supplied to the holder unit 14 by the pulsation generating means 16. The pulsation generating means 16 is of a novel construction and manner of functioning and the pressure pulsations produced thereby have the characteristics needed for the successful functioning of the holder unit 14. This pulsation generating means will now be described in greater detail.

The pulsation generating means 16 is shown in FIGS. 9 to 18 and comprises a housing 92 having a camshaft 93 rotatable therein, and also having a cylinder bore 94 extending through the housing in a crossing relation to the rotation axis 95 of the camshaft. The housing 92 includes cover members 96 and 97 (see FIG. 11) mounted thereon in a closing relation to the outer ends of the bore 94 so as to form pumping chambers 98 and 99 at such outer ends. The pulsation generating means 16 also comprises a piston body 100 reciprocable in the bore 94 and having piston portions 101 and 102 at opposite ends thereof which extend toward the covers 96 and 97 and operate in the pumping chambers 98 and 99 for subjecting hydraulic fluid to pressure therein.

Figure 9:
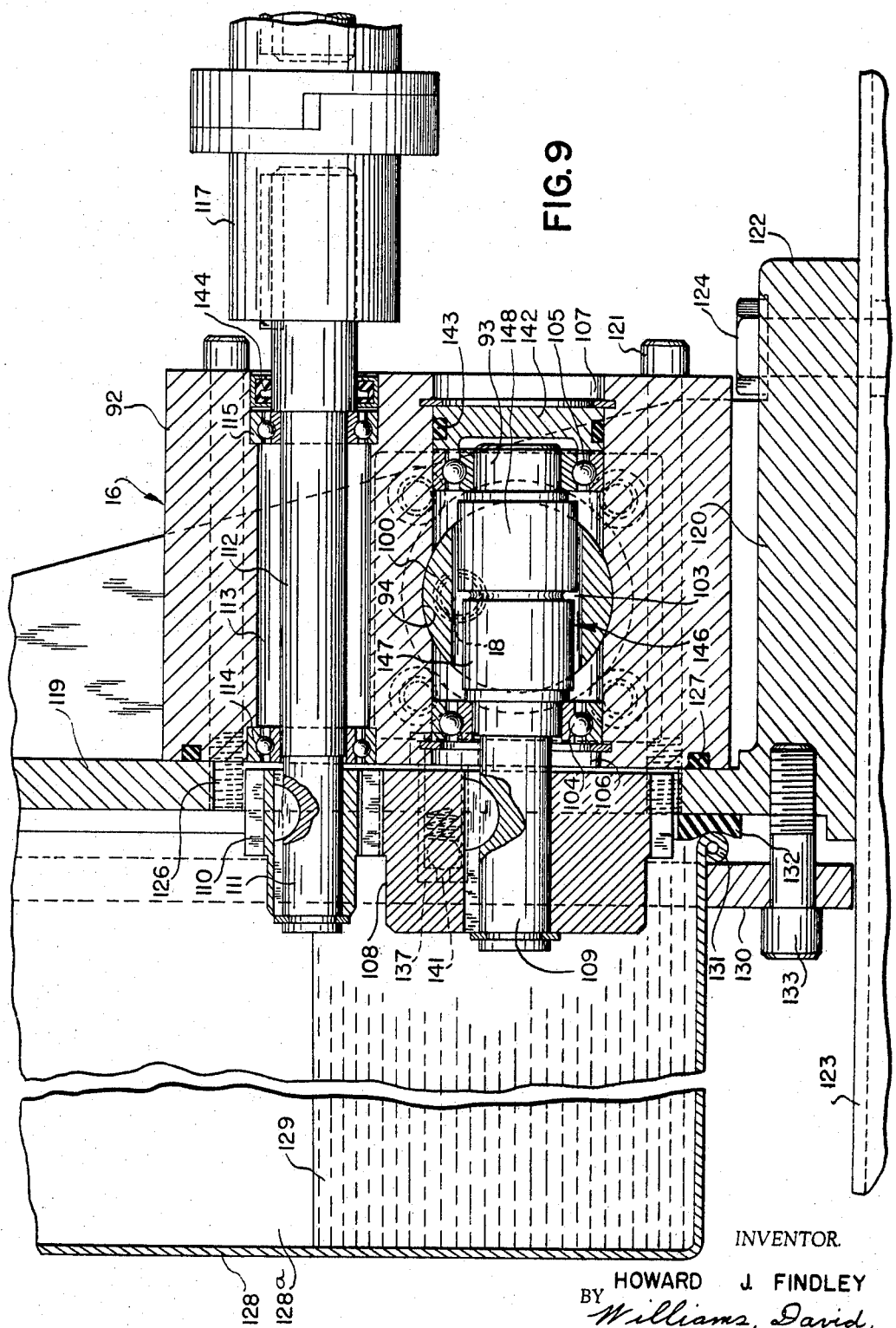
FIG. 9 is a vertical axial section taken through hydraulic pressure pulsation generating means as indicated by section line 9—9 of FIG. 1.

The piston body 100 has an opening 103 extending therethrough transversely thereof through which the camshaft 93 extends as shown in FIGS. 9 and 11. The camshaft 93 is supported for rotation by suitable antifriction bearings 104 and 105 mounted in openings 106 and 107 of the housing 92. The camshaft 93 is rotated by a gear 108 secured on a projecting end portion 109 thereof and which gear is driven by a pinion 10 mounted on a similarly projecting end portion 111 of a pinion shaft 112.

The pinion shaft 112 is here shown as disposed in a parallel relation to the camshaft 93 and extends through an opening 113 (see FIG. 9) of the housing 92. The pinion shaft 112 is mounted in antifriction bearings 114 and 115 and is driven by a suitable power device such as the electric motor 116 which is connected therewith by the coupling 117.

The housing 92 is supported by being connected with the upright plate portion 119 of a bracket-like frame member 120 by suitable screws 121. The frame member 120 also includes a base portion 122 which is secured to a suitable mount 123 as by bolts 124 and which mount can be located adjacent the frame 20 of the lathe 11 or can be formed by a portion of the lathe frame.

The plate portion 119 of the frame member 120 has an opening 126 therethrough, in this case a circular opening, which is of a suitable size to accommodate the gear 108 and the pinion 110 when the housing 92 is secured against the plate portion by the screws 121. A suitable packing 127 is provided on the housing 92 and engages the plate portion 119 around the opening 126 to prevent leakage of fluid between the housing and such plate portion.

On the side of the plate portion 119 remote from the housing 92 a reservoir member 128, of cup-shaped form and having a chamber 128ª therein, is positioned so as to maintain a body of hydraulic fluid 129, such as a suitable oil, in an available relation for the pumping chambers 98 and 99. The reservoir member 128 is connected with the plate portion 119 by a clamping ring 130 effective against an annular bead 131 for pressing the beaded end into sealing engagement with a gasket 132. Screws 133 extending through the clamping ring 130 and engaged in threaded openings of the frame member 120 maintain the beaded end of the reservoir member 128 in such sealing engagement with the gasket 132.

The supply of hydraulic fluid 129 can be introduced into the reservoir chamber 128ª through a filler tube 135 (see FIG. 1). The filler tube is normally closed at the top thereof by a removable cover 136 of the venting type.

The pump chambers 98 and 99 are in communication with the reservoir chamber 128ᵃ through check valves 137 and 138 which are mounted on the housing 92 (see FIGS. 9 and 11) and project into the reservoir chamber. The check valves 137 and 138 have inwardly opening check valve members 139 which permit hydraulic fluid to readily flow from the reservoir chamber into the pump chambers but which are urged toward closed position by compression springs 140 for normally preventing pressure fluid from returning to the reservoir chamber during the pumping stokes of the pistons 101 and 102. The hydraulic fluid 129 is maintained at a level in the reservoir chamber 128ᵃ so that the check valves 137 and 138 have their inlet openings 141 in a normally submerged relation in the hydraulic fluid, as is shown in FIG. 9 for the check valve 137.

By having the gears 108 and 110 of the pulsation generating means 16 project into the reservoir chamber 128ᵃ, as shown in FIG. 9, their operation will be very quiet inasmuch as noise and vibration will be confined and subdued. This position of the gears also provides for continuous lubrication and cooling thereof by the hydraulic fluid 129 of the reservoir chamber. Some of the hydraulic fluid also flows readily to the antifriction bearings 104 and 105 supporting the camshaft 93 and lubricates and cools those bearings. Some of the hydraulic fluid also lubricates and cools the bearings 114 and 115 of the pinion shaft 112. A suitable cover 142 and an associated packing 143 are provided in the housing opening 107 adjacent the camshaft bearing 105 for preventing fluid leakage. A suitable packing ring 144 is also provided in the housing opening 113 adjacent the bearing 115 for preventing fluid leakage around the pinion shaft 112.

The piston body 100 is reciprocated in the bore 94 by cam means 146 provided on the camshaft 93 and located in the transverse opening 103 of the piston body. The cam means 146 is here shown as comprising a pair of adjacent cam members 147 and 148. The cam member 147 operates to produce the work stroke of the piston 101 toward the left in the cylinder chamber 98 and the cam member 148 operates to produce the work stroke of the piston 102 toward the right in the cylinder chamber 99. Since the pistons 101 and 102 are in opposite ends of the same piston body 100, they operate with the same length of stroke. The work stroke of the piston 101 occurs concurrently with the return stroke of the piston 102 and likewise, the work stroke of the piston 102 occurs concurrently with the return stroke of the piston 101.

The cam members 147 and 148 are of such shapes that they have the same maximum eccentricity or throw, and hence, the pistons 101 and 102 are caused to operate with the same length of work stroke. The volumes of pressure fluid delivered by the pistons 101 and 102 during their work strokes are therefore equal, and likewise, the fluid intake volume for each cylinder chamber during the return stroke of the piston therein is the same as the pressure fluid delivery volume from the other cylinder chamber during the work stroke of the piston operating in the latter.

The contours of the cam members 147 and 148 are different, however, as will be explained in detail hereinafter. In general, the contour of the cam member 147 is such that it produces a relatively rapid-work-stroke movement of the piston 101 and causes the given volume of pressure fluid, being delivered from the cylinder chamber 98 through the conduit 18 to the cylinder chamber 73 of the power device 17, to occur as a strong and sudden pressure pulsation for causing the above-described pulse movement of the tool 15.

The contour of the cam member 148 is such that it produces a similar work-stroke movement of the piston 102 in the opposite direction and causes the given volume of pressure fluid, being delivered from the cylinder chamber 99 through the conduit 19 to the cylinder chamber 74 of the power device 17, to cause a rapid return movement of the tool 15 to its original position.

The piston body passage 103 is shown in FIGS. 13 to 18 as being of a quadrangular cross-sectional shape and includes two axially adjacent passage portions 103ᵃ and 103ᵇ in which the cam members 147 and 148 are located respectively. The passage portion 103ᵃ has a pair of diametrically opposed side walls 150 and 151 of which the wall 150 is a thrust wall against which the cam member 147 applies piston-actuating thrust in the direction of the above-described work-stroke movement of the piston 101. The passage portion 103ᵇ has diametrically opposed side walls 153 and 154 of which the wall 154 is a thrust wall against which piston-actuating thrust in the opposite direction is exerted by the cam member 148. The passage 103ᵇ includes a clearance space 152 adjacent the side wall 153 whose purpose will be presently explained.

The fluid pressure pulsation produced by the piston 101 results from the rapid work-stroke movement of the piston body 100 toward the left, as seen in FIGS. 11 and 13, and this is obtained from the particular contour of the cam member 147. As shown in FIGS. 11 and 13 the cam member 147 has a lift portion 155 whose sides 155ᵃ and 155ᵇ are relatively steep. The remainder of the cam member 147 is a relief portion 156 which is of a substantially cylindrical contour. The cam member 147 is constructed so that the length of the major axis of its cross-sectional contour shape is substantially equal to the width of the space between the opposed walls 150 and 151. The cam member 147 will always have contact with one or the other of the walls 150 and 151 but thrust action of the rapid-lift portion 155 occurs only against the wall 150.

During rotation of the camshaft 93 in a given direction such as that indicated by the arrow 149 one of the steep sides of the lift portion 155, such as the side 155ᵇ, will press against the side wall 150 of the piston body 100 and as the lift portion sweeps around in the passage portion 103ᵃ in contact with the wall 150, a rapid pumping stroke will be imparted to the piston 101 toward the left as seen in FIGS. 11 and 13. This is the work stroke of the piston 101 by which the above-described pressure fluid pulsation will be generated in the pump chamber 98 and delivered therefrom to the cylinder chamber 73 of the toolholder unit 14 through the conduit 18.

As shown in FIG. 14 the cam member 148 has a cylindrical portion 158 extending therearound for an angular distance substantially greater than 180°. The remaining portion of the cam member 148 is a relief portion 159 of a relatively flatter curvature. The cylindrical portion 158 is on the same side of the camshaft 93 as the lift portion 155 of the cam member 147 and has as its radius the maximum radial dimension of the cam member 147, that is, the radial distance from the rotation axis 95 to the apex of the lift portion 155.

The relief portion 159 of the cam member 148 is of a relatively flat curvature and portions thereof form inclined lift portions 159ᵃ and 159ᵇ on opposite ends of the cylindrical portion 158. The radial distance of the mid-point of the relief portion 159 from the rotation axis 95 is the same as the radius of the cylindrical portion 156 of the cam member 147. The angular location of the lift portions 159ᵃ and 159ᵇ relative to the lift portion 155 is such that as the latter lift portion moves away from the wall 150 (see FIG. 15) one of the former lift portions, in this case the lift portion 159ᵇ becomes effective against the wall 154 (see FIG. 16) to impart the above-mentioned work stroke movement to the piston 102 toward the right for causing the return movement of the tool 15 to its original position.

The presence of the clearance space 152 permits the piston body 100 to be moved toward the right by the lift portion 159ᵇ of the cam member 148 without having the wall 153 come into engagement with the cylindrical cam portion 158. Further rotation of the camshaft 93 causes the cylindrical portion 158 to remain in contact with the wall 154 as a dwell portion (see FIG. 18) until the side 155ᵇ of the lift portion 155 of the cam member 147 again becomes effective against the wall 150. During the rotary movement of the camshaft 93 while the cylindrical cam portion 158 is in engagement with the wall 154, the piston body 100 will be in its initial or rest position and the tool 15 will be in its original position.

From the contour described above for the cam members 147 and 148 and their co-operation with the associated thrust walls 150 and 154 of the piston body 100, it will be seen that for each revolution of the camshaft 93 the piston body 100 will be actuated through one cycle of reciprocation consisting of one work stroke of the piston 101 for delivering a pressure fluid pulsation to the cylinder chamber 73 of the toolholder unit 14, followed immediately by one work stroke of the piston 102 for delivering a similar but opposite pressure fluid pulsation to the cylinder chamber 74 of the unit 14. During the portion of the camshaft rotation occurring between the work strokes of the piston 102 and 101, the piston body 100 will be held stationary by the cam members 147 and 148 and during this time the tool 15 will remain in its original position.

The piston body 100, and the bore 94 in which it operates in the housing 92, are shown as being of a cylindrical cross-sectional shape. Rotation of the piston body in the bore and around its own axis is prevented so that the cam members 147 and 148 will not be subjected to any binding effect and also so that the thrust walls of the piston body passage 103 will always be correctly presented for engagement by the cam members. For preventing any such rotation of the piston body 100 in the bore 94 a guide pin 161 (see FIG. 11) is provided on the cover member 97 and engages in a slot 162 of a fork projection 163 provided on the piston body 100.

From the accompanying drawings and the foregoing detailed description it will now be readily understood that this invention provides a novel method and novel apparatus by which material removed from a workpiece by a cutting tool will comprise a cutting having weakened portions of decreased thickness at spaced locations therealong and will therefore be subject to breakage into chips as the cutting is produced. It will now also be seen that the weakened portions of the cutting result from minor irregularities formed on the workpiece portion being cut by sudden short-stroke pulse movements of the tool along the direction of the feed movement by which the tool is pressed against such workpiece portion, and that the minor irregularities formed on the workpiece portion during one revolution of the workpiece are removed with the cutting during the next succeeding revolution of the workpiece.

It will now be further recognized that the method and apparatus of this invention utilize hydraulic pressure pulsations for producing the sudden pulse movements of the cutting tool and that the toolholder unit, in which the pressure pulsations are converted into the sudden pulse movements, is of a construction which is readily reversible for use in machining operations with the tool disposed in either a right-hand or left-hand position as desired. Additionally, it will be seen that the use of cam-actuated piston means for generating the pressure fluid pulsations makes it possible to obtain pulsations of the characteristics desired for the most effective functioning of the cutting tool and which are a sudden pulse movement in one direction for causing the irregularities on the workpiece for breakage of the cutting into chips, followed immediately by a similar return pulse movement in the other direction by which the tool is returned to its original position where it remains until the next succeeding pulse movement occurs.

Although the novel method and apparatus of this invention have been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In toolholder apparatus; a support means including an abutment means; holder means having flexible means adjacent said abutment means; a cutting tool connected with said flexible means and engageable with a workpiece along a cutting path; fluid pressure responsive means effective between said abutment means and said flexible means for flexing the latter in a direction transverse to the cutting path; and fluid pressure pulsation producing means connected with said responsive means for supplying spaced discrete fluid pressure pulsations spaced in time to the latter to cause repeated sudden short-stroke pulse movements of the tool in a given direction from a normal working position relative to the workpiece portion being cut for breaking the cutting into chips as it is being produced.

2. In toolholder apparatus; a support means including an abutment means; holder means having flexible means adjacent said abutment means; a cutting tool connected with said flexible means and engageable with a workpiece; means operable to impart a feed movement to the tool for engaging the same with the workpiece portion to be cut; fluid pressure responsive means effective between said abutment means and said flexible means for flexing the latter along the direction of said feed movement; and fluid pressure pulsation producing means connected with said responsive means for supplying discrete fluid pressure pulsations spaced in time to the latter to cause repeated sudden flexing of said flexible means and resulting successive sudden short-stroke pulse movements of the tool along the direction of said feed movement; said short-stroke pulse movements of the tool being effective to cause minor thickness variations in the cutting and breakage of the latter into chips as it is being removed from the workpiece.

3. Toolholder apparatus according to claim 2 wherein said flexible means comprises arms on opposite sides of said abutment means and connected for flexing movement in unison; said pulse movements of said tool being in a direction toward the workpiece portion being cut.

4. Toolholder apparatus according to claim 2 wherein said flexible means comprises arms on opposite sides of said abutment means and connected for flexing movement in unison; said tool being mounted on one of said arms and said pulse movements of the tool being in a direction away from the workpiece portion being cut.

5. Toolholder apparatus according to claim 2 wherein said tool comprises shank means connected with said flexible means and a cutting tip on said shank means; the position of said tool and the position of said responsive means being such that the direction of said feed movement and the direction of said pulse movements are both transverse to the axis of said shank means.

6. In toolholder apparatus; a support means including an abutment projection rising thereabove; seat means on the upper end of said projection; holder means having an upper anchorage portion clamped against said seat means and a flexible side portion depending from said anchorage portion and lying adjacent one side of said projection; means for mounting a cutting tool on said side portion with the tip of the tool projecting therefrom for engagement with a workpiece; and pressure fluid responsive means on said projection and effective against said side portion to rapidly flex the latter for imparting a sudden pulse movement to said tool.

7. Toolholder apparatus according to claim 6 and including a tool having shank means supporting the cutting tip; said side portion having a channel recess for receiving said shank means; and means associated with said channel recess for clamping engagement with said shank means.

8. Toolholder apparatus according to claim 7 wherein said support means, said holder means and said pressure fluid responsive means comprise an assembly unit adapted for use with said tool supported thereby in either a right-hand or left-hand work position; said channel recess being open at opposite ends thereof to permit the tip-supporting portion of said shank means to project from said channel recess at either end thereof depending upon whether the right-hand or left-hand work position is desired for said tool.

9. Toolholder apparatus according to claim 7 wherein said support means, said holder means and said pressure fluid responsive means comprise an assembly unit adapted for use with said tool supported thereby in either a right-hand or left-hand work position; said channel recess being open at opposite ends thereof to permit the tip-supporting portion of said shank means to project from said channel recess at either end thereof depending upon whether the right-hand or left-hand work position is desired for said tool; said tool having a heel portion at the end of said shank means remote from the cutting tip; and heel-engageable back-up means selectively positionable in one or the other of the open ends of said channel recess in accordance with the right-hand or left-hand positioning of said tool.

10. In toolholder apparatus; a support means including an abutment projection rising thereabove; a yoke having an intermediate portion secured to the upper end of said projection, and flexible side portions connected with said intermediate portion and depending therefrom on opposite sides of said projection; tool-engageable means on one of said side portions for mounting a cutting tool thereon; means spaced from said intermediate yoke portion and connecting said side portions for flexing thereof in unison; and pressure fluid responsive means effective between said projection and said side portions for imparting a rapid flexing movement to the yoke to cause a sudden pulse movement of said tool.

11. Toolholder apparatus as defined in claim 10 wherein said support means includes a lateral securing flange on one side of said projection and adjacent the lower end thereof; said side portions of said yoke comprising relatively long and relatively short side portions of which the latter side portion is on the same side of said projection as said flange; said long side portion having said tool engageable means thereon.

12. In toolholder apparatus; a support means including an abutment projection rising thereabove; a yoke having an intermediate portion secured to the upper end of said projection, and flexible side portions connected with said intermediate portion and depending therefrom on opposite sides of said projection; tool engageable means on one of said side portions for mounting a cutting tool thereon; a first pressure fluid responsive means effective between said projection and said one side portion for imparting a rapid flexing movement to the latter with a consequent sudden pulse movement of said tool; a second pressure fluid responsive means effective between said projection and the other side portion for flexing the latter to cause return movement of the tool following the pulse movement thereof; and means connecting said side portions so that the flexing thereof occurs in unison.

13. Toolholder apparatus according to claim 12 wherein said projection has passages connected with said first and second pressure fluid responsive means for supplying pressure fluid thereto.

14. Toolholder apparatus according to claim 12 wherein said projection has passages connected with said first and second pressure fluid responsive means for supplying pressure fluid thereto; and valve means on said projection for controlling the pressure fluid supply to said first and second pressure fluid responsive means.

15. In toolholder apparatus; a support means including an abutment means; holder means on said support means including a flexible portion adjacent said abutment means; a cutting tool for engaging a workpiece along a cutting path; tool engaging means on said flexible portion for mounting said tool on the latter; hydraulic fluid pressure responsive means effective between said abutment means and said flexible portion for causing rapid flexing of the latter and a resulting sudden short-stroke pulse movement of said tool in a direction transverse to the cutting path; and hydraulic pulsation-generating means having discharge means connected with said fluid pressure responsive means for supplying discrete hydraulic pressure pulsations to the latter at spaced time intervals.

16. In machine tool apparatus; toolholder means including flexible means having a cutting tool mounted thereon for engaging a workpiece along a cutting path; hydraulic pressure pulsation responsive means effective to cause repeated rapid flexing of said flexible means in a given direction transverse to the cutting path for producing corresponding sudden short-stroke pulse movements of said tool in said given direction; and hydraulic pressure pulsation-generating means having discharge means connected with said responsive means for supplying discrete pressure pulsations thereto at spaced time intervals.

17. In machine tool apparatus; toolholder means including flexible means having a cutting tool mounted thereon; hydraulic pressure pulsation responsive means effective to cause repeated rapid flexing of said flexible means for producing corresponding sudden short-stroke pulse movements of said tool, each said pulse movement comprising a movement in a given direction and a return movement in the opposite direction; pump housing means having cylinder means connected with said responsive means; piston means in said cylinder means and operable with successive rapid work strokes for causing successive hydraulic pressure pulsations to be generated and supplied to said responsive means; and rotary cam means for imparting said work strokes to said piston means.

18. In machine tool apparatus; toolholder means including flexible means having a cutting tool mounted thereon; hydraulic pressure pulsation responsive means comprising a pair of expansible chamber devices effective to cause rapid flexing of said flexible means in opposite directions for producing corresponding sudden short-stroke forward and return pulse movements of said tool relative to a workpiece; pump housing means having a pair of cylinders connected with said devices; pistons in said cylinders and operable with successive rapid work strokes for causing successive hydraulic pressure pulsations to be generated and supplied to said devices; and rotary cam means comprising first and second cam portions for imparting said work strokes to said pistons.

19. In machine tool apparatus; toolholder means including a reaction means and a yoke member having flexible arms on opposite sides of said reaction means; a cutting tool mounted on one of said arms; a first hydraulic pressure pulsation responsive means effective between said reaction means and said one arm; a second hydraulic pressure pulsation responsive means effective between said reaction means and the other of said arms; means connecting said arms so that flexing thereof must take place in unison; pump housing means having first and second cylinder chambers; pistons operable in said first and second cylinder chambers for generating pressure pulsations; means connecting said first cylinder chamber with said first responsive means for delivery of a pressure pulsation to the latter for flexing said arms in one direction; means connecting said second cylinder chamber with said second responsive means for delivery of a pressure pulsation to the latter for flexing said arms in the opposite direction; and rotary cam means for causing work strokes of said first and second pistons in an alternating relation.

20. Apparatus according to claim 19 wherein said cam means comprises a first lift portion effective to cause a work stroke of said first piston during one portion of the cam rotation and a second lift portion for causing a work stroke of said second piston during another portion of the cam rotation.

21. Apparatus according to claim 20 and comprising a piston body having said first and second pistons on opposite ends thereof; said piston body having a transverse opening and thrust walls adjacent said opening and associated with the respective pistons; and shaft means rotatable in said opening for engaging said lift portions with said thrust walls.

22. In machine tool apparatus for holding a cutting tool for removing material from a turning workpiece comprising; means for holding the cutting tool in engagement with the turning workpiece; means for imparting a feed movement to the tool during the cutting of the workpiece so that portions of the cutting path of the tool lie in side by side relation for successive revolutions of the workpiece; and means for periodically at spaced time intervals imparting discrete sudden short stroke pulse movements to the tool in succession in the same direction as the path of said feed movement to form minor thickness variations in the cutting at points spaced therealong as it is being removed from the workpiece so that the cutting will be broken at its points of minimum thickness to divide the same into chips.

References Cited

UNITED STATES PATENTS

| 1,292,494 | 1/1919 | Lorenz | 82—916 |
| 3,056,320 | 10/1962 | Findley | 82—36 |
| 3,174,404 | 3/1965 | Findley | 90—24 |
| 2,044,497 | 6/1936 | Schiltz | 82—1 |
| 3,135,148 | 6/1964 | Cole et al. | 82—1 |
| 2,988,943 | 6/1961 | Trible | 82—36 |

FOREIGN PATENTS 147,412  10/1962  Russia.

LEONIDAS VLACHOS, Primary Examiner

U.S. Cl. X.R.

51—59; 82—1